United States Patent
Hao et al.

(10) Patent No.: US 11,280,952 B2
(45) Date of Patent: Mar. 22, 2022

(54) LIGHT GUIDE COMPONENT, BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yutao Hao, Beijing (CN); Ying Chen, Beijing (CN); Zhanchang Bu, Beijing (CN); Jinku Lv, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 594 days.

(21) Appl. No.: 16/300,094

(22) PCT Filed: Feb. 12, 2018

(86) PCT No.: PCT/CN2018/076515
§ 371 (c)(1),
(2) Date: Nov. 9, 2018

(87) PCT Pub. No.: WO2019/007079
PCT Pub. Date: Jan. 10, 2019

(65) Prior Publication Data
US 2021/0223459 A1 Jul. 22, 2021

(30) Foreign Application Priority Data
Jul. 3, 2017 (CN) .......................... 201710532989.4

(51) Int. Cl.
*F21V 8/00* (2006.01)

(52) U.S. Cl.
CPC .......... *G02B 6/0046* (2013.01); *G02B 6/0036* (2013.01); *G02B 6/0055* (2013.01);
(Continued)

(58) Field of Classification Search
CPC .... G02B 6/005; G02B 6/0075; G02B 6/0076; G02B 6/0078
See application file for complete search history.

(56) References Cited

U.S. PATENT DOCUMENTS 10,657,352 B2 * 5/2020 Lee .................... G06K 9/00013
2006/0083021 A1 4/2006 Jeong et al.
(Continued)

FOREIGN PATENT DOCUMENTS

CN 1928667 A 3/2007
CN 101158773 A 4/2008
(Continued)

OTHER PUBLICATIONS

International Search Report and Written Opinion for Application No. PCT/CN2018/076515, dated May 22, 2018, 10 Pages.
(Continued)

*Primary Examiner* — Keith G. Delahoussaye
(74) *Attorney, Agent, or Firm* — Brooks Kushman P.C.

(57) ABSTRACT

A light guide component, a backlight module and a display device are provided. The light guide component includes: a first light guide member including a first surface and a second surface opposite to each other, where a plurality of lattice points for the light emission are arranged on the first surface; a plurality of second light guide members fixed to the second surface, where each second light guide member has a light-incidence side surface through which the light emitted by the edge-lighting light source enters into the second light guide member.

18 Claims, 4 Drawing Sheets

(52) U.S. Cl.
CPC ......... *G02B 6/0075* (2013.01); *G02B 6/0076* (2013.01); *G02B 6/0078* (2013.01)

(56) References Cited

U.S. PATENT DOCUMENTS

| | | | |
|---|---|---|---|
| 2007/0058393 A1 | 3/2007 | Kim et al. | |
| 2008/0260328 A1* | 10/2008 | Epstein | G02B 6/0028 385/32 |
| 2009/0295744 A1* | 12/2009 | Onishi | G06F 3/0412 345/173 |
| 2010/0118562 A1 | 5/2010 | Kubo et al. | |
| 2012/0242930 A1* | 9/2012 | Ryu | G02B 6/0076 349/62 |
| 2013/0229828 A1 | 9/2013 | Chen | |
| 2014/0091332 A1 | 4/2014 | Medendorp, Jr. et al. | |
| 2014/0226361 A1 | 8/2014 | Vasylyev | |
| 2015/0185393 A1* | 7/2015 | Bang | G02B 6/0023 362/608 |
| 2015/0316704 A1* | 11/2015 | Ho | G02B 6/0031 362/97.1 |
| 2018/0348423 A1* | 12/2018 | Vasylyev | G02B 6/0078 |

FOREIGN PATENT DOCUMENTS

| | | |
|---|---|---|
| CN | 101652606 A | 2/2010 |
| CN | 102109130 A | 6/2011 |
| CN | 104165307 A | 11/2014 |
| CN | 105650490 A | 6/2016 |
| CN | 205331987 U | 6/2016 |
| JP | 2004152720 A | 5/2004 |
| TW | M273739 U | 8/2005 |
| TW | 201102720 A | 1/2011 |
| TW | 201533378 A | 9/2015 |

OTHER PUBLICATIONS

Extended European Search Report for EP Application No. 18793349.4, dated Oct. 9, 2019, 8 Pages.
First Office Action for Chinese Application No. 201710532989.4, dated May 5, 2019, 8 Pages.

\* cited by examiner

LIGHT GUIDE COMPONENT, BACKLIGHT MODULE AND DISPLAY DEVICE

CROSS-REFERENCE TO RELATED APPLICATIONS

This application is the U.S. national phase of PCT Application No. PCT/CN2018/076515 filed on Feb. 12, 2018, which claims priority to Chinese Patent Application No. 201710532989.4 filed on Jul. 3, 2017, which are incorporated herein by reference in their entireties.

TECHNICAL FIELD

The present disclosure relates to a display technology and in particular to a light guide component, a backlight module and a display device.

BACKGROUND

At present, a plane light source of a backlight module of a liquid crystal display includes an edge-lighting backlight source and a direct-lighting backlight source. The display having the backlight module with the direct-lighting backlight source may realize a control by regions, emit light uniformly and be applicable to a large-size display panel. However, the light source needs sufficient space to mix the light, so it is difficult to reduce the thickness of the backlight module and the display may not be made thin and light.

SUMMARY

The present disclosure is to provide a light guide component, a backlight module and a display device, to solve the technical issue in the related art that the backlight module of the light guide plate cannot realize a control by regions and meanwhile being made thin and light.

A light guide component is provided, including:

a first light guide member including a first surface and a second surface opposite to each other;

at least one second light guide member arranged at a side of the second surface away from the first surface, where the second light guide member includes a light-incidence side surface and a light-emission side surface unparalleled to each other, the second light guide member is configured to enable light incident through the light-incidence side surface to transmit within the second light guide member, emerge through the light-emission side surface and enter into the first light guide member through the second surface.

Optionally, an included angle between the light-incidence side surface and the second surface is greater than or equal to 45 degrees.

Optionally, each light-incidence side surface is perpendicular to the second surface.

Optionally, the second light guide member is fixed to the second surface through an optical adhesive layer, and the light emerging through the light-emission side surface enters into the first light guide member through the optical adhesive layer.

Optionally, a refractive index of the first light guide member is larger than or equal to a refractive index of the optical adhesive layer, and the refractive index of the optical adhesive layer is larger than or equal to a refractive index of the second light guide member.

Optionally, a refractive index of the first light guide member and a refractive index of the second light guide member are both greater than or equal to 1.42.

Optionally, each second light guide member forms a hexahedron structure, a first face of the hexahedron structure is fixed to the second surface, and a second face of the hexahedron structure connected to the first face of the hexahedron structure forms the light-incidence side surface.

Optionally, a reflective layer is attached to faces of the hexahedron structure excepting for the first face, the second face and a third face opposite to the first face.

Optionally, the second light guide member includes a curved face connected to the light-incidence side surface.

Optionally, the second light guide member further includes a connection face fixed to the second surface, a first edge of the light-incidence side surface is connected to a first edge of the connection face, where two opposite edges of the curved face are respectively connected to a second edge of the light-incidence side surface and a second edge of the connection face; where the second edge of the light-incidence side surface is opposite to the first edge of the light-incidence side surface, and the second edge of the connection face is opposite to the first edge of the connection face.

Optionally, a reflective layer is attached to faces of the second light guide member excepting for the curved face, the connection face and the light-incidence side surface of the second light guide member.

Optionally, each position point of the curved face has a bending curvature enabling light reaching the curved face of the second light guide member to be totally reflected by the curved face.

Optionally, in the case that a refractive index of the first light guide member and a refractive index of the second light guide member are both 1.5, an angle between a tangent plane of each position point of the curved face and an horizontal plane is smaller than or equal to 3.2 degrees.

Optionally, the light guide component includes a plurality of second light guide members arranged on the second surface and in an array.

Optionally, a plurality of lattice points are arranged on the first surface, and the light entering into the first light guide member emerges through the lattice points.

Optionally, each second light guide member forms a hexahedron structure including a top face, a bottom face and four lateral faces, the top face of the hexahedron structure is connected to the second surface, and one of the four lateral faces connected to the top face is the light-incidence side surface; where a reflective layer is attached to faces of the hexahedron structure excepting for the top face, the bottom face and the light-incidence side surface.

Optionally, each second light guide member forms a pentahedron structure including a connection face connected to the second surface, the light-incidence side surface, two lateral faces and a curved face connected to the connection face, the light-incidence side surface and the two lateral faces.

A backlight module is further provided, including at least one light source and the light guide component hereinabove, where the at least one light source are arranged in a one-to-one correspondence to the at least one second light guide member, and light emitted by each light source enters into the light guide component through the light-incidence side surface of the corresponding second light guide member.

Optionally, the light guide component includes a plurality of second light guide members, the backlight module includes a plurality of light sources, and the light sources are arranged in a one-to-one correspondence to the second light guide members.

A display device including the backlight module hereinabove is further provided.

DETAILED DESCRIPTION

Figure 1:
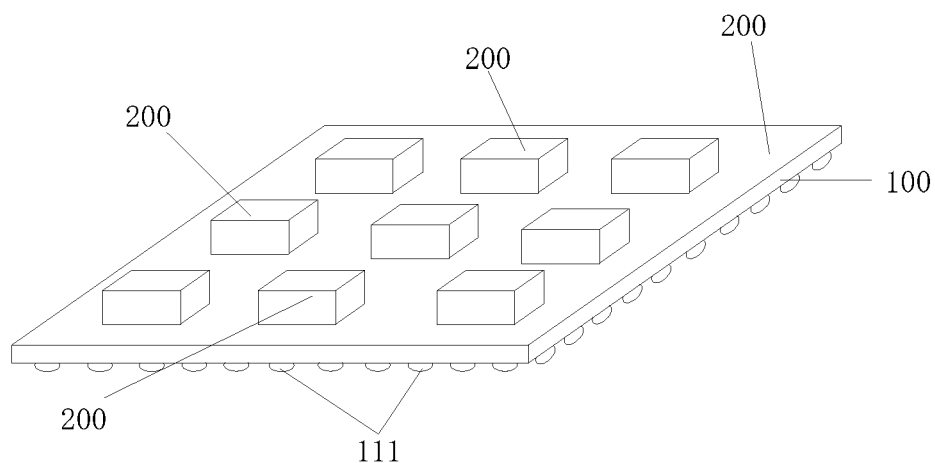
FIG. 1 is a stereogram of a light guide component in some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the related art, the display having the edge-lighting backlight module may be made thin and light, however the light source thereof may only perform a control by regions in a one-dimension direction, but may not perform a control by regions in a two-dimension direction. In addition, the coupling efficiency of the light emitted by the light source arranged at the lateral side of the light guide plate and coupled to the light guide plate is based on thicknesses and sizes of the light source and the light guide plate. Only when the thickness of the light source is smaller than that of the light guide plate, the light incident to the light guide plate may be coupled adequately.

As described hereinabove, the flat-plate type light guide plate in the related art having whether the edge-lighting backlight source or the direct-lighting backlight source has the above advantages. In the related art, the backlight module cannot be made thin and light as the edge-lighting backlight module meanwhile be capable of realize a control by regions and applicable to the large-size display panel.

A light guide component is provided in some embodiments of the present disclosure, including:

a first light guide member including a first surface and a second surface opposite to each other, where a plurality of lattice points for the light emission are arranged on the first surface;

a plurality of second light guide members fixed to the second surface, where each second light guide member has a light-incidence side surface through which the light emitted by the edge-lighting light source enters into the second light guide member.

In the light guide component in some embodiments of the present disclosure, a plurality of second light guide members are arranged on the second surface of the first light guide member. Because the second surface is opposite to the first surface (serves as a light-emission surface) of the first light guide member, when the light sources, which may be controlled by regions, are respectively arranged at the light-incidence side surfaces of the second light guide members, the second light guide members form light-incidence light sources on the second surface (serves as a light-incidence surface) of the first light guide member, and the light-incidence light sources may meet the requirements of controlling light sources by regions of the first light guide member.

In addition, the light-incidence side surface of the second light guide member may enable the light emitted by the edge-lighting light source to enter into the second light guide member, so the second light guide member may be made as thin as possible. Furthermore, the light emitted by the light source is incident through the second light guide member, the coupling efficiency of the light emitted by the light source and entering into the light guide component may be guaranteed. Therefore, compared with the light guide plate with the edge-lighting backlight module in the related art, by the above arraignment where a plurality of second light guide members are arranged on the first light guide member, the thickness of the light guide component may not be increased too much, and the light guide component may be made thin and light while guaranteeing a higher coupling efficiency of light.

To be specific, in some embodiments of the present disclosure, an angle between the light-incidence side surface of each second light guide member and the first surface is greater than or equal to 45 degrees and smaller than or equal to 135 degrees. That is, the included angle between the light-incidence side surface of each second light guide member and the first surface is greater than or equal to 45 degrees. Optionally, the angle is 90 degrees, to enable the light emitted by the light source arranged at the light-incidence side surface to enter into the second light guide member in an edge-incident manner.

Figure 2:
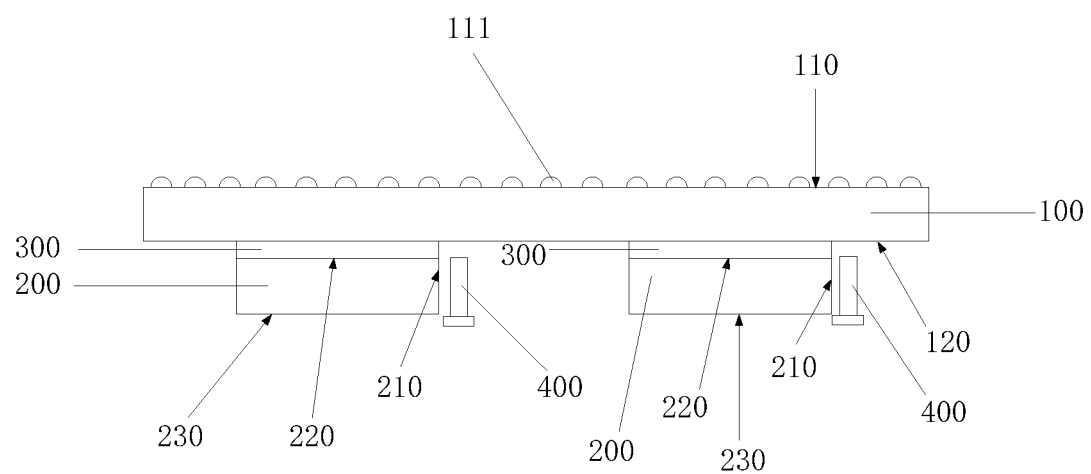
FIG. 2 is a sectional view of a light guide component in some embodiments of the present disclosure.

FIG. 1 is a stereogram of a light guide component in some embodiments of the present disclosure, and FIG. 2 is a sectional view of a light guide component in some embodiments of the present disclosure. Referring to FIG. 1 and FIG. 2, the light guide component in some embodiments of the present disclosure includes:

a first light guide member 100 including a first surface 110 and a second surface 120 opposite to each other, where a plurality of lattice points 111 for the light emission are arranged on the first surface 110, the lattice points 111 form protrude structures on the first surface 110, in some embodiments of the present disclosure, the lattice points 111 may form groove structures;

a plurality of second light guide members 200 fixed to the second surface 120, where each second light guide member 200 has a light-incidence side surface 210, and the second light guide members 200 are arranged in an array on the second surface 120.

Referring to FIG. 2, a light source 400 is opposite to the light-incidence side surface 210. In some embodiments of the present disclosure, the first surface 110 is parallel to the second surface 120, and the light-incidence side surface 210 is perpendicular to the first surface 110 and the second surface 120. Obviously, a portion of the second light guide member 200 fixed to the second surface 120 forms the light-emission side surface 220 of the second light guide member 200. The light-incidence side surface 210 is perpendicular to the light-emission side surface 220, therefore when the light enters into the second light guide member 200 through the light-incidence side surface 210, the light enters into the second light guide member 200 in an edge-incident manner.

In addition, in order to enable the light to enter into the second light guide member 200 in an edge-incident manner, the light-incidence side surface 210 is not limited to be perpendicular to the second surface 120. When an angle between the light-incidence side surface 210 and the second surface 120 is greater than or equal to 45 degrees and smaller than or equal to 135 degrees, i.e., the included angle there between is greater than or equal to 45 degrees, it is also able to enable the light to enter into the second light guide member 200 in an edge-incident manner.

In some embodiments of the present disclosure, each second light guide member 200 forms a hexahedron structure. As shown in FIG. 1 and FIG. 2, a first face of the hexahedron structure is fixed to the second surface 120 and forms the light-emission side surface 220 of the second light guide member 200, and a second face of the hexahedron structure connected to the first face of the hexahedron structure forms the light-incidence side surface 210.

In addition, the second light guide member 200 is fixed to the second surface 120 through an optical adhesive layer 300. In order to guarantee the utilization of the light emitted by the light source 400 and prevent the light transmitted within the light guide component from exiting from the surfaces other than the first surface 110 and cause a light loss, a refractive index $n_2$ of the second light guide member 200 is smaller than equal to a refractive index $n_3$ of the optical adhesive layer 300, and the refractive index $n_3$ of the optical adhesive layer 300 is smaller than equal to a refractive index $n_1$ of the first light guide member 100.

Figure 3:
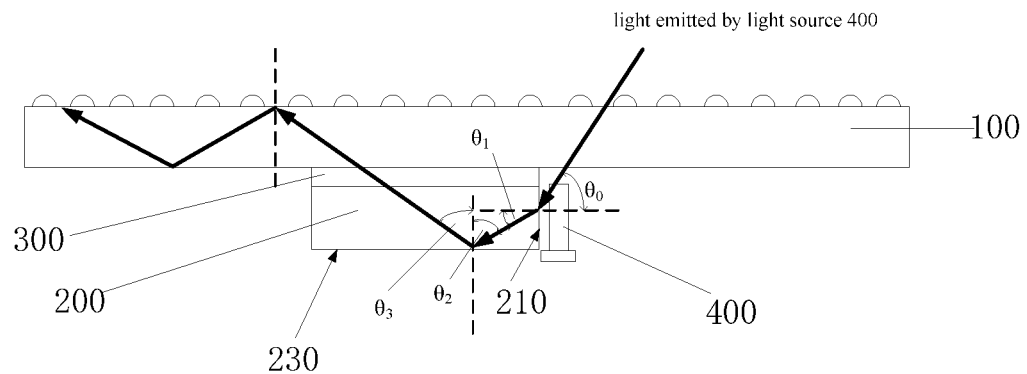
FIG. 3 is a first state view of a light transmission in a light guide component in some embodiments of the present disclosure.

FIG. 3 is a first state view of a light transmission in a light guide component in some embodiments of the present disclosure. When the light emitted by the light source 400 enters into the second light guide member 200 through the light-incidence side surface 210 and with an incident angle $\theta_0$, the refractive angle at the light-incidence side surface 210 is $\theta_1$, then the light transmits within the second light guide member 200 and reaches a third face 230 of the second light guide member 200 at an incident angle $\theta_2$. It can be understood that, in order to prevent the light from exiting to the outside of the second light guide member 200 through the third face 230, the incident angle $\theta_2$ may be greater than or equal to a total reflection angle of the light transmitting to the outside through the second light guide member 200. According to the following refraction law (Formula I), a relationship (Formula II) among $\theta_0$, $\theta_1$ and $\theta_2$, and the total reflection principle, in order to guarantee that the light transmitted within the second light guide member 200 may be totally reflected at the surface of the second light guide member 200, the incident angle $\theta_2$ may satisfy the following Formula III:

$n_2 \sin \theta_1 = n_0 \sin \theta_0$; Formula 1:

$\theta_2 = 90° - \theta_1$; Formula 2:

$n_2 \sin \theta_2 \geq n_0$. Formula 3:

$n_0$ is an refractive index of the transmission space outside the light guide component.

Generally, the transmission space outside the light guide component is the air, when $n_0=1$, $\theta_0=90°$, $n_2 \geq \sqrt{2}$.

That is, based on the above description, as long as the refractive index $n_2$ of the second light guide member 200 is greater than or equal to 1.42, the light reaching the surface of the second light guide member 200 may be totally reflected at the surface of the second light guide member 200 and reflected toward the first light guide member 100 rather than exiting to the outside of the light guide component.

Similarly, when the refractive index $n_1$ of the first light guide member 100 is greater than or equal to 1.42, the light reaching the surface of the first light guide member 100 may be totally reflected at the surface of the first light guide member 100, thereby preventing the light from exiting to the outside and causing the light loss.

Optionally, in order to prevent the light from being totally reflected when passing through the second light guide member 200 and the optical adhesive layer 300 and transmitting to the first light guide member 100, the refractive index $n_2$ of the second light guide member 200 is smaller than equal to the refractive index $n_3$ of the optical adhesive layer 300, and the refractive index $n_3$ of the optical adhesive layer 300 is smaller than equal to the refractive index $n_1$ of the first light guide member 100.

Figure 4:
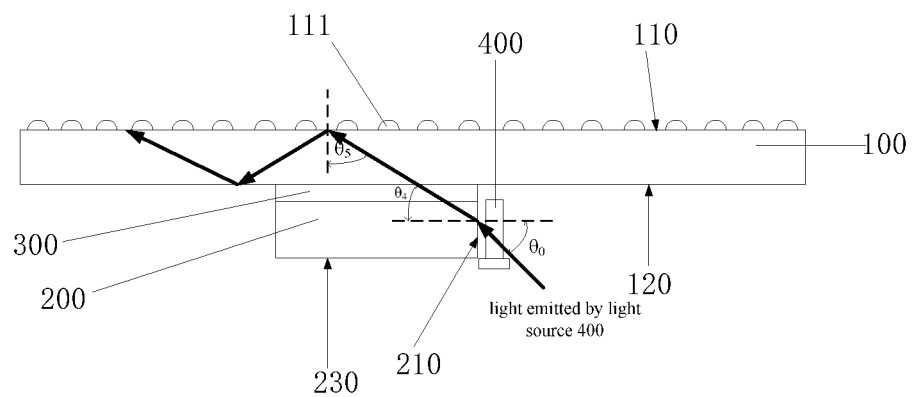
FIG. 4 is a second state view of a light transmission in a light guide component in some embodiments of the present disclosure.

Furthermore, for the light transmitting within the first light guide member 100, as shown in FIG. 4, when light emitted by the light source 400 enters into the second light guide member 200 through the light-incidence side surface 210 and with an incident angle $\theta_0$, the refractive angle at the light-incidence side surface 210 is $\theta_4$, then the light transmits to the first surface 110 of the first light guide member 100 through the second light guide member 200, the optical adhesive layer 300 and the first light guide member 100. In order to enable the light to transmit uniformly within the first light guide member 100, the incident light reaching the portion of the first surface 110 of the first light guide member 100 without the lattice points 111 may be totally reflected. In the light guide component in some embodiments of the present disclosure, when the refractive index $n_2$ of the second light guide member 200 is smaller than equal to the refractive index $n_3$ of the optical adhesive layer 300, the refractive index $n_3$ of the optical adhesive layer 300 is smaller than equal to the refractive index $n_1$ of the first light guide member 100, and the refractive index $n_1$, the refractive index $n_2$ and the refractive index $n_3$ are all greater than or equal to 1.42, it may be guaranteed that the light may be totally reflected at the first surface 110. The specific argumentation process is as follows:

assuming that $n_1 = n_2 = n_3 = 1.5$, the refractive index of the outside $n_0 = 1$, then according to the total reflection calculation formula, the total reflection angle at the first surface 110 is 41.8 degrees. In addition, according to the refraction principle, Formula 4 is $n_2 \sin \theta_4 = n_0 \sin \theta_0$;

According to Formula IV, it is able to obtain Formula 5:

$$\theta_4 = \arcsin\left(\frac{n_0 \sin \theta_0}{n_2}\right);$$

when $\theta_0$ is of the maximum value (90 degrees), the maximum value of $\theta_4$ is 41.8 degrees.

Correspondingly, as shown in FIG. 4 which shows the relationship among the incident angles, when the incident angle of the light at the first surface 110 is $\theta_5$, $\theta_5$ and $\theta_4$ satisfy the following Formula 6: $\theta_5=90'-\theta_4$.

To be specific, based on the above Formula VI, when $\theta_4$ is of the maximum value 41.8 degrees, $\theta_5$ is of the minimum value 48.2 degrees. Obviously, the minimum value of $\theta_5$ is larger than the total reflection angle (41.8 degrees) at the first surface 110. As such, when the incident light transmits to the surface of the first surface 110 through the light-incidence side surface 210 of the second light guide member 200, it is able to guarantee that light may be totally reflected at the corresponding surface, so as to guarantee that the light within the first light guide member 100 may transmit uniformly.

Optionally, a reflective layer is attached to the surfaces of the second light guide member 200 excepting for the connection surface (first face) between the first light guide member 100 and the second light guide member 200, the light-incidence side surface 210 and the surface (third face) opposite to the first face, so as to further guarantee that the light transmitting within the light guide component may be reflected when entering into the second light guide member 200 through the surfaces of the second light guide member 200 excepting for the first face between the first light guide member 100 and the second light guide member 200, the light-incidence side surface 210 and the third face.

In the light guide component in some embodiments of the present disclosure, when the light emitted by the light source 400 enters into the second light guide member 200 through the light-incidence side surface 210, the light is totally reflected within the second light guide member 200 toward the first light guide member 100. Because the refractive index of the second light guide member 200, the optical adhesive layer 300 and the first light guide member 100 increase by degrees or equal to each other, it is able to guarantee that the light transmitting within the second light guide member 200 may enter into the first light guide member 100 through the optical adhesive layer 300 without being reflected.

In addition, when the light transmitting within the first light guide member 100 transmits to the portion of the first surface 110 without the lattice points 111, the light is totally reflected. A part of the reflected light reenters into the second light guide member 200 through the connection portion between the first light guide member 100 and the second light guide member 200, and then reflected by the surface of the second light guide member 200 and reenters into the first light guide member 100; when the reflected light transmits to the portion other than the connection portion between the first light guide member 100 and the second light guide member 200, the reflected light may be totally reflected within the first light guide member 100.

When the light transmitting within the first light guide member 100 transmits to the lattice points 111 on the first surface 110, the light may be lead out from the first surface 110 to form a plane light source by the structure characteristic of the lattice points 111.

Therefore, according to the transmission of the light within the light guide component in some embodiments of the present disclosure, the light transmitting between first light guide member 100 and the second light guide member 200 may be totally reflected, thereby guaranteeing the utilization of the light emitted by the light source. In addition, by controlling distribution density of the lattice points 111 on the first surface 110, it is able to improve the light distribution of the light-emission surface.

The light guide component in some embodiments of the present disclosure includes the first light guide member and a plurality of second light guide members arranged on the second surface of the first light guide member, and the light sources, which may be controlled by regions, are respectively arranged at the light-incidence side surfaces of the second light guide members, so that it is able to control the light sources of the first light guide member by regions. In addition, compared with the light guide plate with the direct-lighting backlight module in the related art, the light-incidence side surface of the second light guide member enable the light to enter into the second light guide member in an edge-incident manner, the thickness of the light guide component may not be increased too much, and the light guide component may be made thin and light while guaranteeing a higher coupling efficiency of light.

Therefore, based on the above description, the light guide component in some embodiments of the present disclosure may control the light sources by regions and may be made thin and light.

Figure 5A:
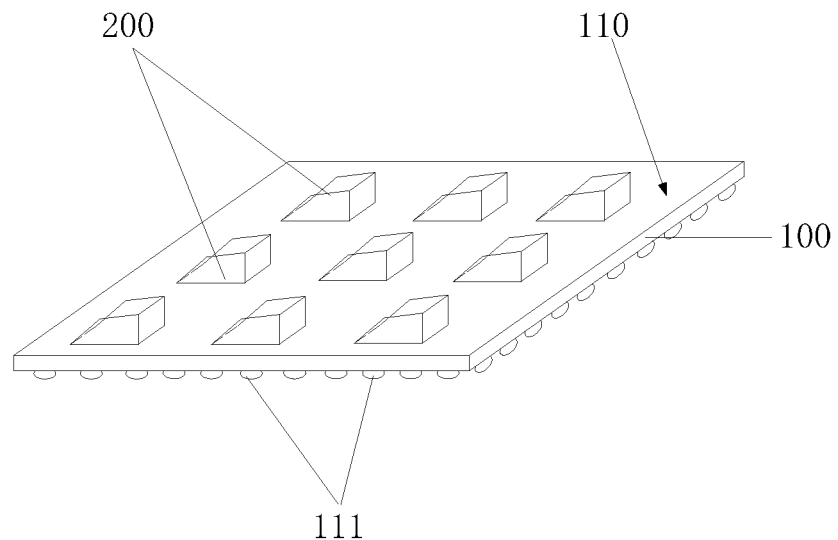
FIG. 5a is a stereogram of a light guide component in some embodiments of the present disclosure.
Figure 5B:
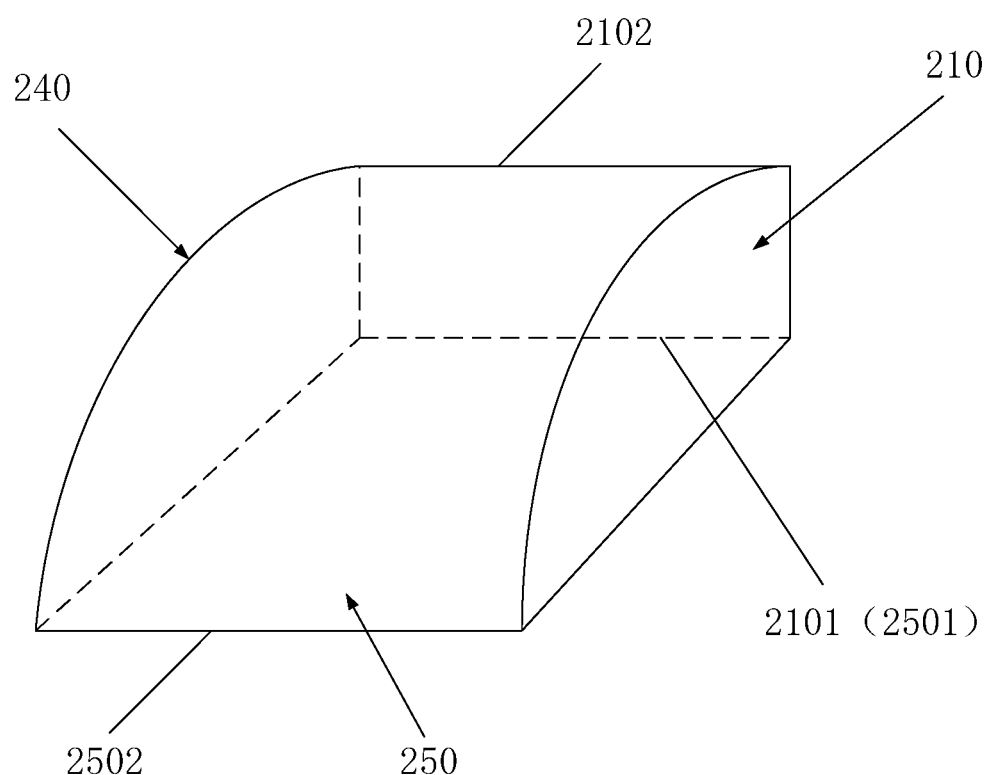
FIG. 5b is a stereogram of a second light guide member of a light guide component in some embodiments of the present disclosure.
Figure 6:
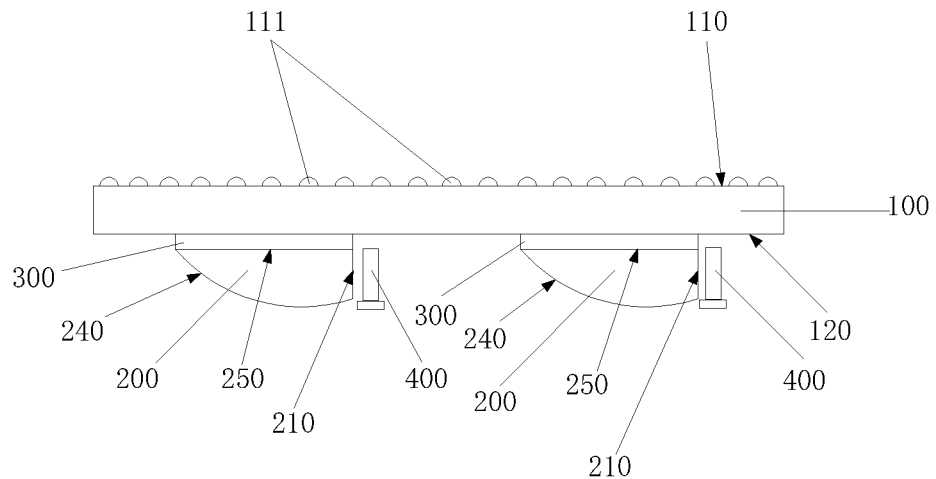
FIG. 6 is a sectional view of a light guide component in some embodiments of the present disclosure.

In addition, a light guide component is further provided in some embodiments of the present disclosure, as shown in FIG. 5a, FIG. 5b and FIG. 6, the light guide component includes:

a first light guide member 100 including a first surface 110 and a second surface 120 opposite to each other, where a plurality of lattice points 111 for the light emission are arranged on the first surface 110, the lattice points 111 form protrude structures on the first surface 110, in some embodiments of the present disclosure, the lattice points 111 may form groove structures;

a plurality of second light guide members 200 fixed to the second surface 120, where each second light guide member 200 has a light-incidence side surface 210, and the second light guide members 200 are arranged in an array on the second surface 120.

Referring to FIG. 5a, FIG. 5b and FIG. 6, a light source 400 is opposite to the light-incidence side surface 210. In some embodiments of the present disclosure, the first surface 110 is parallel to the second surface 120, and the light-incidence side surface 210 is perpendicular to the first surface 110 and the second surface 120. Obviously, a portion of the second light guide member 200 fixed to the second surface 120 forms the light-emission side surface (corresponding to the connection surface 250 shown in FIG. 6) of the second light guide member 200. The light-incidence side surface 210 is perpendicular to the light-emission side surface 220, therefore when the light enters into the second light guide member 200 through the light-incidence side surface 210, the light enters into the second light guide member 200 in an edge-incident manner.

In some embodiments of the present disclosure, when an angle between the light-incidence side surface 210 and the second surface 120 is greater than or equal to 45 degrees and smaller than or equal to 135 degrees, i.e., the included angle there between is greater than or equal to 45 degrees, it is also able to enable the light to enter into the second light guide member 200 in an edge-incident manner.

Referring to FIG. 5b and FIG. 6, in some embodiments of the present disclosure, the second light guide member 200 includes a curved face 240 connected to the light-incidence side surface 210. To be specific, as shown in FIG. 5b and FIG. 6, the second light guide member 200 is connected to the second surface 120 through a connection face 250. When a first edge 2101 of the light-incidence side surface 210 is connected to a first edge 2501 of the connection face 250, two opposite edges of the curved face 240 are respectively connected to a second edge 2102 of the light-incidence side surface 210 and a second edge 2502 of the connection face

250. The second edge 2102 of the light-incidence side surface 210 is opposite to the first edge 2101 of the light-incidence side surface 210, and the second edge 2502 of the connection face 250 is opposite to the first edge 2501 of the connection face 250. As shown in FIG. 5b, each second light guide member forms a pentahedron structure including a connection face connected to the second surface 120, the light-incidence side surface 210, two lateral faces and a curved face 240 connected to the connection face, the light-incidence side surface 210 and the two lateral faces.

Optionally, the curved face 240 is arranged between the light-incidence side surface 210 and the connection face 250, and the bending curvature of the curved face 240 changes from the light-incidence side surface 210 to the connection face 250 to form a smooth curved face.

Of course, the curved face 240 of the second light guide member 200 is not limited to the above structures, and other curved structures are also practicable.

In some embodiments of the present disclosure, the second light guide member 200 is fixed to the second surface 120 through an optical adhesive layer 300.

According to some embodiments of the present disclosure and the description above for FIG. 3, when the surfaces of the first light guide member 100 and the second light guide member 200 are planar surfaces, as long as the refractive index n_1 of the first light guide member 100 and the refractive index n_2 of the second light guide member 200 are both greater than or equal to 1.42, the light transmitting within the first light guide member 100 and the second light guide member 200 may be totally reflected at the corresponding surfaces. Therefore, in some embodiments of the present disclosure, the refractive index n2 of the second light guide member 200 is smaller than equal to the refractive index n3 of the optical adhesive layer 300, the refractive index n3 of the optical adhesive layer 300 is smaller than equal to the refractive index n1 of the first light guide member 100, and the refractive index n1, the refractive index n2 and the refractive index n3 are all greater than or equal to 1.42.

In some embodiments of the present disclosure, each position point of the curved face 240 of the second light guide member 200 has a bending curvature enabling light reaching the curved face of the second light guide member 200 to be totally reflected by the curved face.

Figure 7:
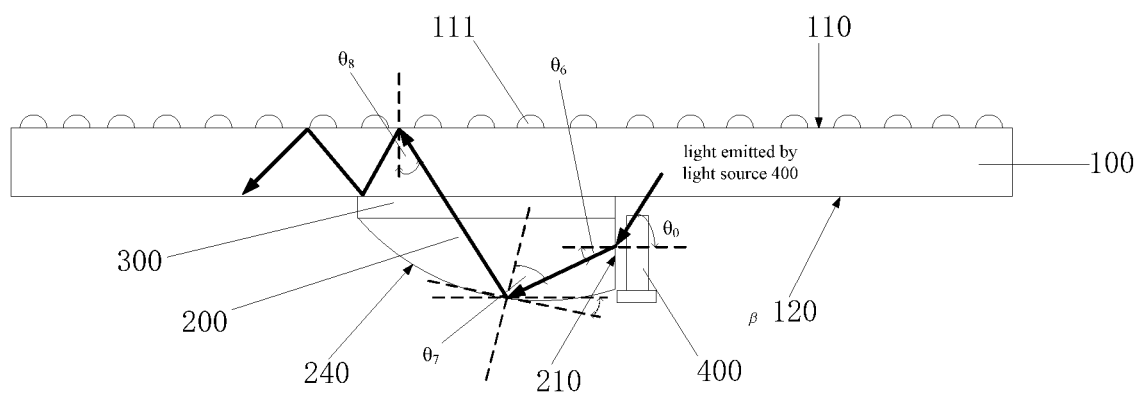
FIG. 7 is a state view of a light transmission in a light guide component in some embodiments of the present disclosure.

FIG. 7 is a state view of a light transmission in a light guide component in some embodiments of the present disclosure. When light emitted by the light source 400 enters into the second light guide member 200 through the light-incidence side surface 210 and with an incident angle $\theta_0$, the refractive angle at the light-incidence side surface 210 is $\theta_6$, then the incident light transmits to the curved face 240 with an incident angle $\theta_7$ relative to the normal line of the tangent plan a of the incident point on the curved face 240. In order to prevent the light from exiting to the outside, the light incident to the curved face 240 may be totally reflected. The light incident to the curved face 240 may be reflected toward the first surface 110 of the first light guide member 100, and the incident angle of the light at the first surface 110 is $\theta_8$.

As shown in FIG. 7, when the light transmitting within the second light guide member 200 enters through curved face 240, the bending curvature of the total reflection at the curved face 240 is obtain as follows:

assuming that $n_1=n_2=n_3=1.5$, the refractive index of the outside $n_0=1$, then according to the total reflection calculation formula, the total reflection angle at the curved face 240 of the second light guide member 200 is 41.8 degrees.

According to the refraction principle and the relationship among the angles, $$n_2 \sin \theta_6 = n_0 \sin \theta_0;\qquad\text{Formula 7:}$$

$$\theta_7 = 90° - \theta_6 - \beta;\qquad\text{Formula 8:}$$

$$\beta_8 = \beta_7 - \beta;\qquad\text{Formula 9:}$$

β is the included angle between the tangent plan a and the horizontal plane.

Based on Formula 7, $$\theta_6 = \arcsin\left(\frac{n_0 \sin \theta_0}{n_2}\right);\qquad\text{(Formula 10)}$$

Based on Formula 8 and Formula 9, in order to meet the total reflection conditions, $\theta_7 \geq \theta_c$, and $\theta_8 \geq \theta_c$;

Based on Formula 8 to Formula 10, $\theta_7 = 48.2° - \beta \geq \theta_c$, and $\theta_8 = 48.2° - 2\beta \geq \theta_c$;

$\theta_c = 41.8$, so $\beta \leq 3.2°$.

It should be understood that, the included angle β between the tangent plan a and the horizontal plane may define the bending curvature of the corresponding position on the curved surface. Therefore, based on the above infer, when the refractive indexes of the first light guide member 100, the second light guide member 200 and the optical adhesive layer 300 are all 1.5 and an included angle between a tangent plane of each position point of the curved face and an horizontal plane is smaller than or equal to 3.2 degrees, the light within the second light guide member 200 may be totally reflected at all the position points of the curved face 240.

Of course, the refractive indexes of the first light guide member 100, the second light guide member 200 and the optical adhesive layer 300 are not limited to 1.5, as long as the refractive index $n_2$ of the second light guide member 200 is smaller than equal to the refractive index $n_3$ of the optical adhesive layer 300, the refractive index $n_3$ of the optical adhesive layer 300 is smaller than equal to the refractive index $n_1$ of the first light guide member 100, and the refractive index $n_1$, the refractive index $n_2$ and the refractive index $n_3$ are all greater than or equal to 1.42. It should be understood that, based on the above infer, it is able to obtain, when the refractive indexes of the first light guide member 100, the second light guide member 200 and the optical adhesive layer 300 meet the above requirements, the included angles β with which the light is totally reflected at all the position points of the curved face 240.

In addition, when the light emitted by the light source 400 enters through the light-incidence side surface 210, a part of the incident light directly transmits to the first surface 110 of the first light guide member 100 through the second light guide member 200, the optical adhesive layer 300 and the first light guide member 100. The transmission of such incident light is the same as that shown in FIG. 4, where the incident light reaching the first surface 110 of the first light guide member 100 may be totally reflected. The specific principle thereof may refer to FIG. 4 and some embodiments of the present disclosure, and the detailed description thereof is omitted herein.

In some embodiments of the present disclosure, a reflective layer is attached onto the surfaces of the second light guide member 200 excepting for the portion of the first light guide member 100 connected to the second light guide member 200, the curved face 240 and the light-incidence side surface 210, to guarantee that the light transmitting within the second light guide member 200 may be totally reflected when reaching the surfaces of the second light guide member 200 excepting for the portion of the first light guide member 100 connected to the second light guide member 200, the curved face 240 and the light-incidence side surface 210.

In some embodiments of the present disclosure, when the light emitted by the light source 400 enters into the second light guide member 200 through the light-incidence side surface 210 of the second light guide member 200, a part of the light may directly transmit to the curved face 240 of the second light guide member 200 and be totally reflected at the curved face 240 by arranging a suitable bending curvature thereof, to enable the light to transmit toward the first light guide member 100.

Another part of the light entering into the second light guide member 200 through the light-incidence side surface 210 of the second light guide member 200 directly transmit toward the first light guide member 100. Because the refractive index of the second light guide member 200, the optical adhesive layer 300 and the first light guide member 100 increase by degrees or equal to each other, it is able to guarantee that the light transmitting within the second light guide member 200 may enter into the first light guide member 100 through the optical adhesive layer 300 without being reflected and without any loss. When the incident light enters into the first light guide member 100 and transmits to the first light guide member 100, the incident angle thereof meets the total reflection requirement, so the light may be totally reflected. When the light reaches the second surface of the first light guide member 100, a part of the light reenters into the second light guide member 200 through the connection portion between the first light guide member 100 and the second light guide member 200. When the light transmits to the curved face 240, the light may be totally reflected at the curved face 240 by arranging a suitable bending curvature thereof, and then the totally reflected light reenters into the first light guide member 100. In addition, when another part of light reaches the portion other than the connection portion between the first light guide member 100 and the second light guide member 200, the light may be totally reflected within the first light guide member 100.

In addition, when the light transmitting within the first light guide member 100 transmits to the lattice points 111 on the first surface 110, the light may be lead out from the first surface 110 to form a plane light source by the structure characteristic of the lattice points 111.

Therefore, according to the transmission of the light within the light guide component in some embodiments of the present disclosure, the light transmitting between first light guide member 100 and the second light guide member 200 may be totally reflected, thereby guaranteeing the utilization of the light emitted by the light source. In addition, by controlling distribution density of the lattice points 111 on the first surface 110, it is able to improve the light distribution of the light-emission surface.

According to the light guide component in some embodiments of the present disclosure, by the first light guide member and the second light guide members each having a curved face, it is able to adjust the direction of the light reflected by the second light guide member, thereby making the light more uniform.

A backlight module is further provided in some embodiments of the present disclosure, including a plurality of light sources and the above light guide component. The light source are arranged in a one-to-one correspondence to the at least one second light guide member, and light emitted by each light source enters into the light guide component through the light-incidence side surface of the corresponding second light guide member.

A display device including the backlight module hereinabove is further provided in some embodiments of the present disclosure.

Based on the above description about the light guide component in some embodiments of the present disclosure, those skilled in the art may understand the detailed structures of the display device and the backlight module having such light guide component, and the detailed description thereof is omitted herein.

The display device and the backlight module having the light guide component in some embodiments of the present disclosure may realize a control by regions and meanwhile being made thin and light.

The above are merely some embodiments of the present disclosure, but the present disclosure is not limited thereto. Obviously, a person skilled in the art may make further modifications and improvements without departing from the principle of the present disclosure, and these modifications and improvements shall also fall within the scope of the present disclosure.

What is claimed is:

1. A light guide component, comprising:
a first light guide member comprising a first surface and a second surface opposite to each other; and
at least one second light guide member arranged at a side of the second surface away from the first surface, wherein
the second light guide member comprises a light-incidence side surface and a light-emission side surface unparalleled to each other, the second light guide member is configured to enable light incident through the light-incidence side surface to transmit within the second light guide member, emerge through the light-emission side surface and enter into the first light guide member through the second surface;
wherein the second light guide member is fixed to the second surface through an optical adhesive layer, and the light emerging through the light-emission side surface enters into the first light guide member through the optical adhesive layer; and
wherein a refractive index of the first light guide member is larger than a refractive index of the optical adhesive layer, and the refractive index of the optical adhesive layer is larger than a refractive index of the second light guide member.

2. The light guide component according to claim 1, wherein an included angle between the light-incidence side surface and the second surface is greater than or equal to 45 degrees.

3. The light guide component according to claim 2, wherein the light-incidence side surface is perpendicular to the second surface.

4. The light guide component according to claim 1, wherein a refractive index of the first light guide member and a refractive index of the second light guide member are both greater than or equal to 1.42.

5. The light guide component according to claim 1, wherein the second light guide member forms a hexahedron structure, a first face of the hexahedron structure is fixed to the second surface, and a second face of the hexahedron structure connected to the first face of the hexahedron structure forms the light-incidence side surface.

6. The light guide component according to claim 5, wherein a reflective layer is attached to faces of the hexahedron structure excepting for the first face, the second face and a third face opposite to the first face.

7. The light guide component according to claim 1, wherein the second light guide member comprises a curved face connected to the light-incidence side surface.

8. The light guide component according to claim 7, wherein the second light guide member further comprises a connection face fixed to the second surface, a first edge of the light-incidence side surface is connected to a first edge of the connection face, wherein two opposite edges of the curved face are respectively connected to a second edge of the light-incidence side surface and a second edge of the connection face;
wherein the second edge of the light-incidence side surface is opposite to the first edge of the light-incidence side surface, and the second edge of the connection face is opposite to the first edge of the connection face.

9. The light guide component according to claim 7, wherein a reflective layer is attached to faces of the second light guide member excepting for the curved face, the connection face and the light-incidence side surface of the second light guide member.

10. The light guide component according to claim 7, wherein each position point of the curved face has a bending curvature enabling light reaching the curved face of the second light guide member to be totally reflected by the curved face.

11. The light guide component according to claim 10, wherein in the case that a refractive index of the first light guide member and a refractive index of the second light guide member are both 1.5, an angle between a tangent plane of each position point of the curved face and a horizontal plane is smaller than or equal to 3.2 degrees.

12. The light guide component according to claim 1, wherein the light guide component further comprises a plurality of second light guide members arranged on the second surface and in an array.

13. The light guide component according to claim 1, wherein a plurality of lattice points are arranged on the first surface, and the light entering into the first light guide member emerges through the lattice points.

14. The light guide component according to claim 12, wherein each second light guide member forms a hexahedron structure comprising a top face, a bottom face and four lateral faces, the top face of the hexahedron structure is connected to the second surface, and one of the four lateral faces connected to the top face is the light-incidence side surface;
wherein a reflective layer is attached to faces of the hexahedron structure excepting for the top face, the bottom face and the light-incidence side surface.

15. The light guide component according to claim 12, wherein each second light guide member forms a pentahedron structure comprising a connection face connected to the second surface, the light-incidence side surface, two lateral faces and a curved face connected to the connection face, the light-incidence side surface and the two lateral faces.

16. A backlight module, comprising at least one light source and the light guide component according to claim 1, wherein the at least one light source is arranged in a one-to-one correspondence to the at least one second light guide member, and light emitted by each light source enters into the light guide component through the light-incidence side surface of the corresponding second light guide member.

17. The backlight module according to claim 16, wherein the light guide component further comprises a plurality of second light guide members, the backlight module further comprises a plurality of light sources, and the light sources are arranged in a one-to-one correspondence to the second light guide members.

18. A display device comprising the backlight module according to claim 16.

* * * * *